United States Patent [19]

Walker

[11] Patent Number: 4,954,036

[45] Date of Patent: Sep. 4, 1990

[54] VARIABLE HEIGHT SILO CHARGE SYSTEM

[76] Inventor: Harold A. Walker, 326 Hickory Bluff, Johnson City, Tenn. 37601

[21] Appl. No.: 220,030

[22] Filed: Jul. 15, 1988

[51] Int. Cl.⁵ .............................................. B65G 65/38
[52] U.S. Cl. .................................. 414/295; 414/143.1; 414/142.8; 414/786; 414/293; 414/291
[58] Field of Search .............. 414/288, 293, 294, 295, 414/296, 300, 291, 303, 133, 143.1, 142.8, 142.9, 786; 222/64

[56] References Cited

U.S. PATENT DOCUMENTS

| 345,275 | 7/1886 | Bush ................................ 414/300 X |
| 844,477 | 2/1907 | Sieurin ......................... 414/143.1 X |
| 1,309,905 | 7/1919 | Moore ................................... 414/303 |
| 1,720,822 | 7/1929 | Craine et al. . |
| 1,968,071 | 7/1934 | Craine et al. . |
| 2,687,817 | 8/1954 | Browne . |
| 3,182,859 | 5/1965 | Harris et al. . |
| 3,214,035 | 10/1965 | Krause et al. . |
| 3,254,755 | 6/1966 | O'Brien ................................ 414/295 |
| 3,473,677 | 10/1969 | Zeiter . |
| 3,524,557 | 8/1970 | Bakker . |
| 3,556,317 | 1/1971 | Vidal ...................................... 414/133 |
| 3,578,146 | 5/1971 | Mehlscau .............................. 414/295 |
| 3,774,785 | 11/1973 | Gasseling .............................. 414/295 |
| 3,826,385 | 7/1974 | Bluntzer . |
| 3,858,733 | 1/1975 | Morioka et al. ................. 414/295 X |
| 3,877,586 | 4/1975 | Quester . |
| 3,883,011 | 5/1975 | Pennell ................................. 414/291 |
| 4,029,228 | 6/1977 | Shaver ............................ 414/293 X |
| 4,119,193 | 10/1978 | Smith et al. ..................... 414/288 X |
| 4,301,641 | 11/1981 | McElwain et al. .............. 414/295 X |
| 4,360,308 | 11/1982 | Gifford et al. .................... 414/295 X |
| 4,371,305 | 2/1983 | Pannell ................................. 414/300 |
| 4,529,337 | 7/1985 | Hilgraf et al. . |
| 4,564,330 | 1/1986 | McKechnie et al. . |
| 4,721,425 | 1/1988 | Ströcker .......................... 414/300 X |

FOREIGN PATENT DOCUMENTS

| 136950 | 8/1979 | Fed. Rep. of Germany ...... 414/295 |
| 1062663 | 4/1954 | France ................................. 414/295 |
| 1414062 | 9/1965 | France ................................. 414/294 |
| 42431 | 3/1982 | Japan ................................... 414/295 |
| 478269 | 1/1938 | United Kingdom ................ 414/295 |

Primary Examiner—Frank E. Werner
Assistant Examiner—Robert S. Katz
Attorney, Agent, or Firm—Frost & Jacobs

[57] ABSTRACT

A device for depositing particulate matter into a storage silo having a system of containers which are alternately filled at the top of said silo and lowered into said silo where the particulate matter is deposited, free falling only a short distance onto the top of previously deposited particulate matter. In a second embodiment, the particulate matter is deposited onto a conveyor having containers formed thereon, transporting said particulate matter down into said silo and depositing said particulate matter onto a second conveyor which distributes particulate matter onto the previously deposit particulate matter, said second conveyor being maintained at a certain height above the level of the previously deposited particular matter.

18 Claims, 4 Drawing Sheets

VARIABLE HEIGHT SILO CHARGE SYSTEM

BACKGROUND OF THE INVENTION

This invention relates generally to the depositing of loose materials into a storage hopper, and more particularly to a variable height charging system for depositing fragile pellets made of fly ash.

Material storage devices such as silos have long been used to store particulate and loose materials such as grains, and other similar objects. Typically the material to be stored in the silo is loaded into the silo through an opening in the top and is discharged from the silo through a chute in the bottom of the silo. The material as it enters from the top generally falls freely down to the level of previously deposited material. This free fall can be acceptable for certain materials, such as grains which are not particularly fragile or where the fragmentation of the material being stored does not present a problem. There are, however, associated problems with the creation of dust and the nonuniform depositing of the material throughout the silo.

There are several devices, known well in the art, for limiting the speed of the fall of the material being stored which helped to control dust and degradation of the material. For example, U.S. Pat. No. 1,720,822 discloses a telescoping tube extending down the center of the storage bin which can be used through which the material is allowed to free fall to the bottom until the telescoping tube is filled to a level near the top of the tube. Once the level has reached a sufficient height, the material added to the telescoping tube free falls only a short distance to the top of the material in the tube. As more material is added through the tube, the lower sections of the tube are raised, allowing the material at the bottom of the tube to flow from the tube into the storage bin. Thus, the operator can control the height of the material within the tube, and consequently the free fall distance, by the fill rate and the rate that the telescoping tube is raised. As long as a sufficient flow of material is supplied to the tube, newly deposited material can have a relatively short free fall distance. This results in less dust and breakage of the material at the top of the tube. However, as the bottom of the tube is raised, the material flows in a somewhat uncontrollable manner as the exit plane of the telescoping tube is raised above the level of the material in the silo. This results in the creation of dust and breakage of the material at the bottom level. Another problem with this type of device is that the telescoping tube must be filled to a certain height before the free fall of the material can be limited to a short distance. This initial fill of the tube allows the material to free fall the entire length of the silo, resulting in dust and breakage. Furthermore, a telescoping tube of this nature permits the material to remain within the tube between periods of silo changing. Hence, such a system is unsuitable for handling materials that might agglomerate in the tube.

An additional problem with the above described device is the inability to fill the silo all the way to the top. As the telescoping tube retracts, part of it can remain within the silo, even while in its fully retracted position. To resolve this problem a helical chute was added in U.S. Pat. No. 1,968,071 to allow the last portion of the silo to be charged by flowing the material down the chute once the tube had fully retracted. This system has all the disadvantages described above as well as problems with the chute, as described below.

The use of helical chutes which extend all the way to the bottom of the silo is also well known in the art. The angle of the chute must be sufficiently steep so as to allow the material to exit the chute when it reaches the level of material already deposited in the silo. If this angle is too shallow, the material will back up on the chute itself and not discharge at the lower end onto the other material. Once the material has backed up the chute to the fill point of the silo, any additional material is either blocked from entering the silo or simply bypasses the chute, free falling the length of the silo down to the level of material previously deposited.

If the slope of the chute is too great, material flowing down the chute will create dust and also be subjected to degradation. In some cases, depending on the nature of the material to be deposited in the silo, it is impossible to select an angle for the chute which allows the material to flow from the chute at the bottom while not flowing so fast that it creates dust and damages the material. With such material it is necessary to use an alternate method for filling the silo.

There are also devices well known in the art for uniformly distributing material in a silo, some of which are shown in U.S. Pat. Nos. 3,182,859; 3,473,677; and 3,524,557. These devices may take several forms. The charging system may be located Permanently at the top of the silo or storage bin and deposit the material into partitioned compartments of the silo to control the fill of each individual section. Such a system may have a conveyor belt located on tracks at the top of the silo where the ends of the conveyor belt may be shuttled from side to side and the direction of rotation of the conveyor belt may be changed to fill particular compartments. Other systems may be located within the silo itself and used to distribute material from the center of the silo to the outer edges, by use of a conveyor system such as an auger. In the prior art, these systems are used by allowing the material to free fall down to a hopper located at the level of the previously filled material and are thereafter distributed to the edges of the silo by the auger. Both of these systems do not solve the problem of the free fall of the material described above. Dust is created and degradation of the material results from the free fall.

Various types of material may be stored in silos or storage bins. In particular, pellets which are made from fly ash generated by a coal furnace may be so stored for curing. Immediately after formation, these pellets are soft and fragile and need to cure before they can be handled. It is preferred to store these green pellets in a silo at the site of the furnace, where they are cured sufficiently for transportation to another site.

After the pellets have initially been formed, they are very fragile and moist. If they are subjected to a free fall, such as described in the prior art above, they will break into even smaller Particles and tend to agglomerate together. If pellets are loaded into a silo for curing using a system which allows them to break up and agglomerate, the pellets become very difficult, if not impossible to remove them, through the discharge chute at the bottom of the silo. Furthermore, the free fall and degradation of the pellets results in the creation of fly ash dust which must be contained due to air pollution control standards. Thus, a system is needed to deposit fly ash pellets and the like into a storage silo or bin which eliminates these problems.

SUMMARY OF THE INVENTION

It is an object of this invention to alleviate the problems described above. It is a further object of this invention to provide a silo charging apparatus and method whereby a silo or storage hopper may be charged with material, resulting only in insignificant dust and insignificant breakage of the material To this end, the present invention is concerned with a device for minimizing the free fall of any deposited material by using a variable height charging system located within the silo or storage hopper.

BRIEF DESCRIPTION OF THE DRAWINGS

While the specification concludes with claims Particularly Pointing out and distinctly claiming the present invention, it is believed that the same will be better understood from the following description taken in conjunction with the accompanying drawings in which:

DESCRIPTION OF THE PREFERRED EMBODIMENTS

Figure 1:
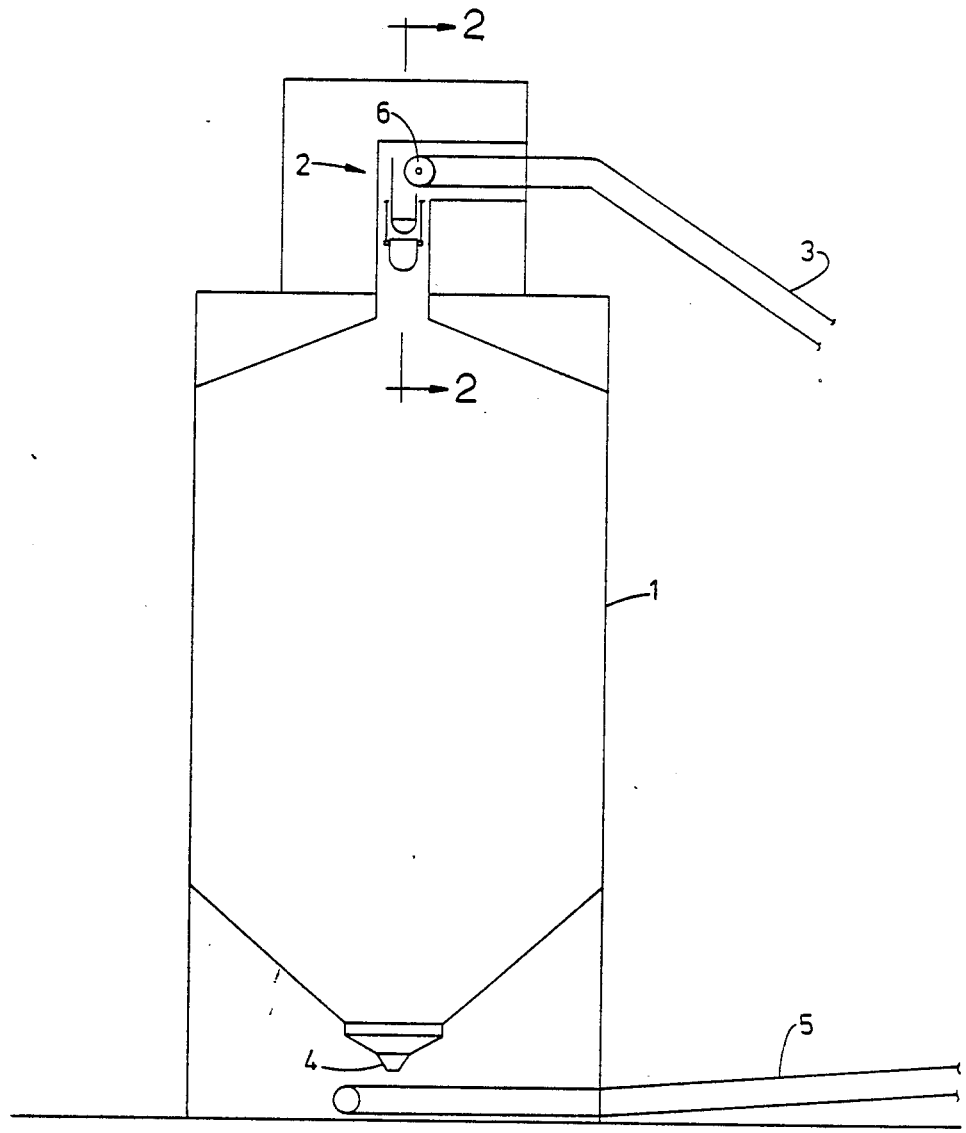
FIG. 1 is a diagrammatic side elevational view in partial cross section of a storage silo.

Referring to FIG. 1, a storage silo 1 is shown having a pellet receiving area 2 at the top of the silo 1. A feed conveyor 3 transports pellets to the top of silo 1 into the pellet receiving area 2. Pellets are removed from the silo 1 through the discharge 4 located at the bottom of silo 1. When pellets are to be removed from silo 1, discharge 4 is opened and pellets fall onto and are transported by discharge conveyor 5 to another location. Conveyors 3 and 5 are driven by any conventional means (not shown).

Figure 2:
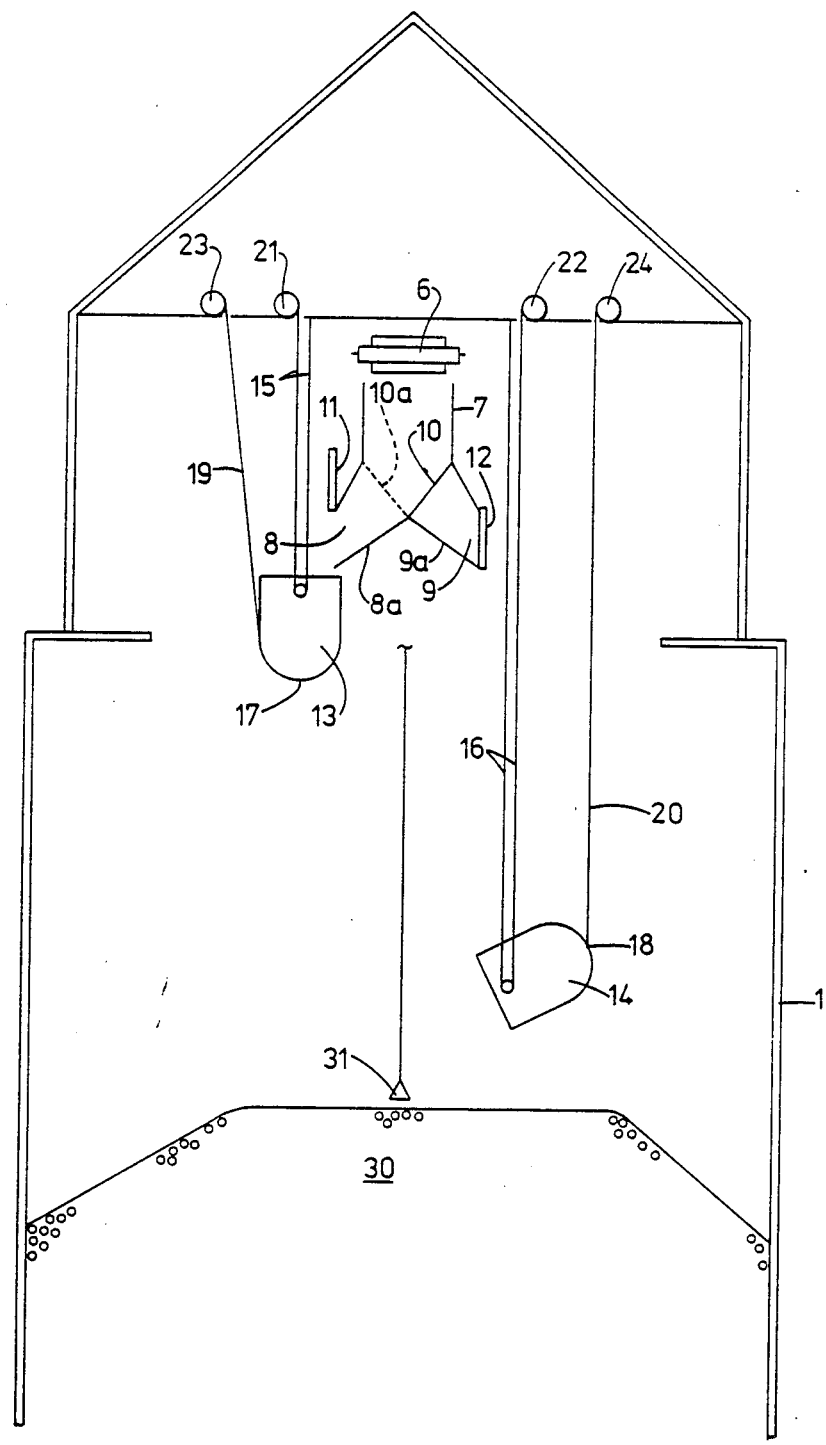
FIG. 2 is a diagrammatic cross sectional view taken along line 2—2 of FIG. 1.

Referring to FIG. 2, pellets are delivered from the end 6 of conveyor 3 into receiving chute 7 which has two legs 8a and 9a with associated exists 8 and 9. Chute 7 is secured to the silo 1 by any suitable means. Each exit 8 and 9 has associated control gates 11 and 12 which cover exits 8 and 9 respectively, and containers 13 and 14, shown in FIG. 2 as buckets.

Bucket 13 is supported by cable 15 which is used to raise and lower bucket 13. Similarly, bucket 14 is supported by cable 16, and is shown in the charge position. Attached to the lower end 17 of bucket 13 is cable 19, which is used for tipping bucket 13 to a discharge position for charging the silo, as is described below. Similarly, cable 20 is attached to lower end 18 of bucket 14.

Bucket 13 is shown held in a first position just under opening 8. Pellets are deposited in chute 7 and flow through leg 8a to exit 8. A diverter gate 10 is shown located within the receiving chute 7 adjacent legs 8a and 9a and selectively movable between 10 and 10a. However, in the preferred embodiment, gate 10 is not needed, its function being satisfied by control gates 11 and 12. Gate 11 is shown in its open position, allowing pellets to flow into bucket 13. When bucket 13 is full, gate 11 is closed and bucket 13 is lowered on cable 15, which is fed out by winch 21 to a second position which just above the level of pellets previously deposited in silo 1, generally indicated at 30.

FIG. 2 shows the discharge position of the bucket 14 at the second position whereby pellets are deposited into silo 1. While being lowered by cable 16 and winch 22, cable 20 is fed out by winch 24 so that the bucket remains in an upright position. When the bucket 14 reaches the appropriate height above the level of pellets 30 in silo 1, winch 24 stops feeding out cable 20, thereby maintaining end 18 at a fixed height. As winch 22 continues to feed out cable 16, bucket 14 rotates about end 18 to an inverted position, from which pellets flow by gravity into the silo.

The level of pellets 30 in silo 1 is detected by sensor 31 which is lowered into the silo to a position just above the pellet level 30. As the level of pellets 30 increases in silo 1, level sensor 31 is moved upward such that it is maintained at a prespecified height above pellet level 30. The level of pellets 30 as sensed by sensor 31 is used to determine the location of the second position to which buckets 13 and 14 are lowered in order to deposit additional pellets.

In this system, while bucket 13 is being filled from leg 8a, the other bucket 14 is lowered and emptied into silo 1. Bucket 14 is then returned to the first position adjacent leg 9a where it is filled with pellets while bucket 13 is lowered into silo 1. The speed of conveyor 3 is controlled such that pellets do not back up in chute 7.

Figure 3:
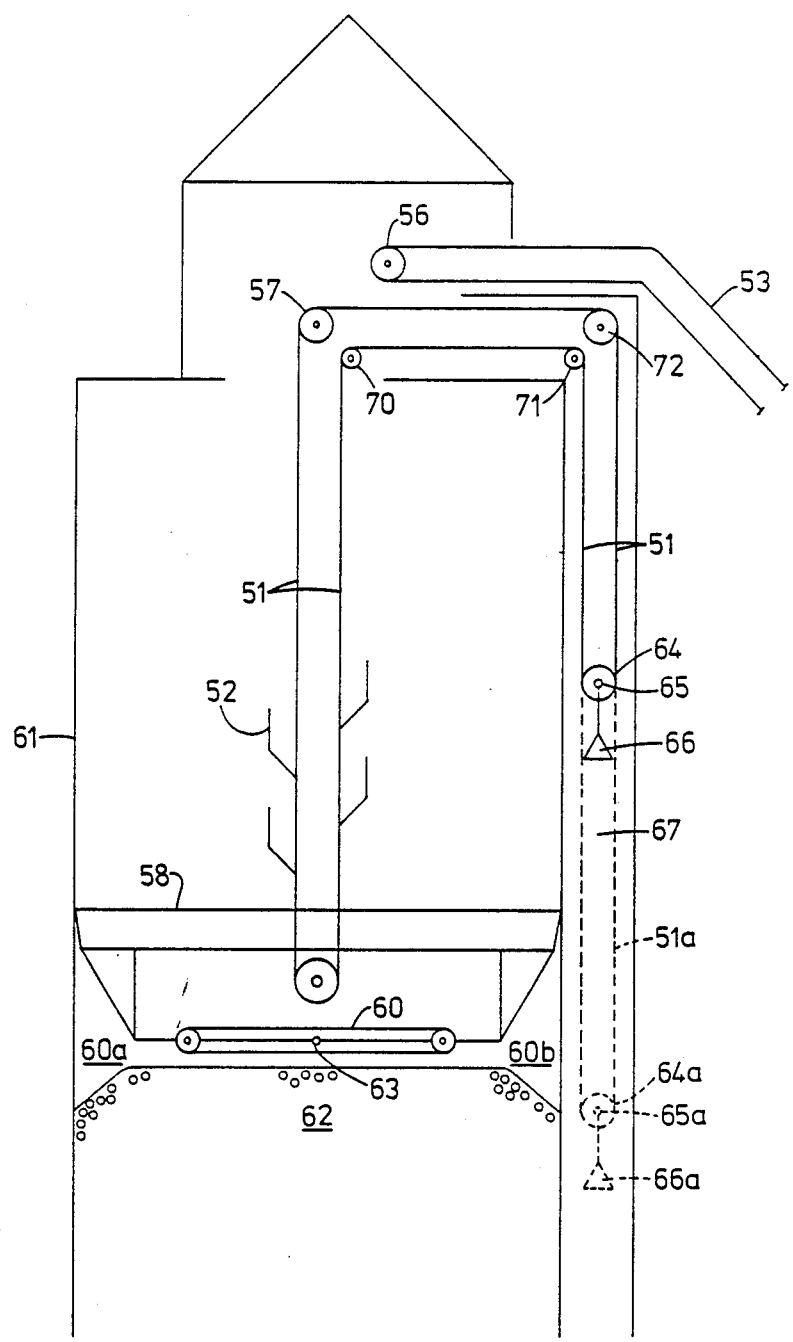
FIG. 3 is a diagrammatic side elevational view in partial cross section of a second embodiment of the invention.
Figure 4:
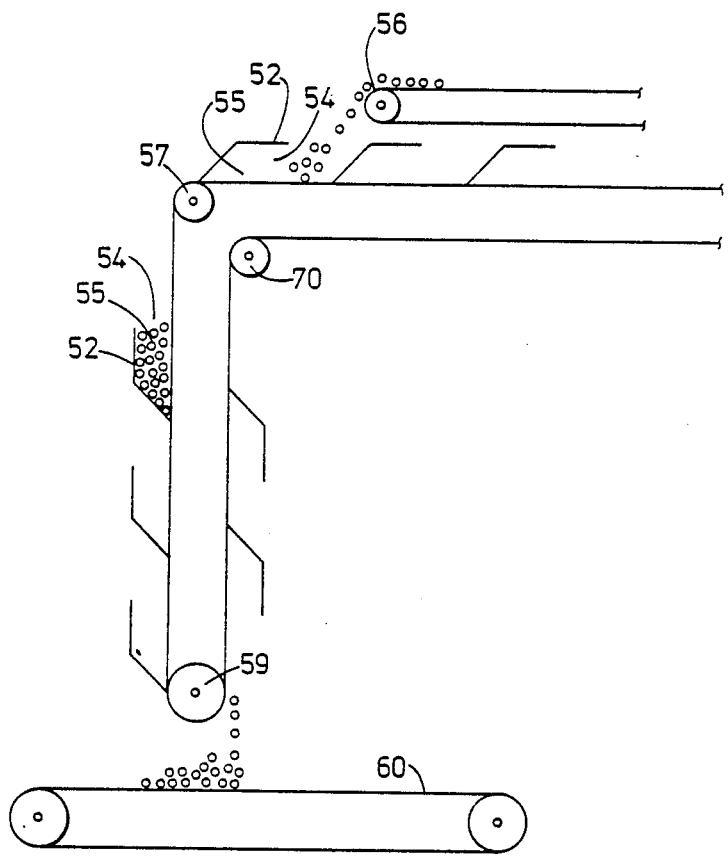
FIG. 4 is a diagrammatic view of the silo charge system of the second embodiment of the system.

A second embodiment of the variable height silo charging system is shown in FIG. 3. This system operates in a continuous method, in contrast to the batch method described above. As shown in FIG. 4, pellets flow from the end 56 of conveyor 53 onto conveyor 51. Conveyors 51 and 53 are driven by any conventional means (not shown). In this position, conveyor 51 is travelling generally horizontally, and has multiple container 52 attached to it. Each container 52 has only one opening 54 through which the pellets reach internal cavity 55. As conveyor 51 travels around roller 57, it begins to travel vertically down. Container 52 are oriented on conveyor 51 such that openings 54 are at the tops of containers 52, and the pellets are contained within internal cavity 55 while in the vertical position.

The containers 52 travel downwardly to the charging system 58. Conveyor 51 travels around roller 59, which is carried by charge system 58, and begins to travel vertically up. This results in the inversion of containers 52 such that openings 54 open downwardly. Pellets fall from internal cavity 55 through opening 54 and onto charge conveyor 60.

As shown in FIG. 3, conveyor 60 is carried by charge system 58, and is located just above the level of pellets 62 previously deposited in silo 61. As pellets are deposited from containers 52 onto conveyor 60, conveyor 60 travels in either direction as selected by an operator, to deposit the pellets into the silo. Conveyor 60 is mounted to charge system 58 such that its discharge ends may be shuttled horizontally between positions 60a, respectively and 60b. Conveyor 60 is driven and shuttled by any conventional means (not shown). The raising and lowering of charge system 58 is controlled by conventional means such as cables and tracks or other methods well known in the art. The height of the level of pellets 62 previously deposited in silo 61 is sensed by sensor 63, which is mounted on charge system 58. The height of charge system 58 is adjusted in response to the level of pellets 62 as measured by sensor 63 such that pellets being deposited by conveyor 60 do not free fall a distance which would cause the pellets to break or form dust.

As pellet level 62 rises within silo 61, charge system 58 is moved up. As charge system 58 moves up, the opposite end 64 of conveyor 51 travels downwardly in compartment 67 separate from the storage portion of silo 61. Conveyor 51 travels around rollers 70 and 71 reaching end 64 as it wraps around roller 65. Conveyor 51 then completes the continuous loop by travelling over roller 72. Roller 65 and end 64 are held in place relative to roller 71 and 72 by weight 66. As charge system 58 is raised within silo 61, end 64 moves downwardly within compartment 67. When silo 61 is completely full, and charge system 58 is at the top of silo 61, the end 64 of belt 51 is in the position shown at 64a. By this structure, the excess portion 51a of belt 51 which exists when charge system 58 is not in its lowest position within silo 61, is disposed within compartment 67 by the downward movement of opposite end 64.

What is claimed is:

1. In a silo for receiving, holding and discharging particulate matter, including delivery means for delivering said matter to the top of said silo, said delivery means being fixed in location with respect to said silo, comprising:
   (a) a plurality of containers disposed within said silo, said containers being movable between a respective first position which is fixed in location at and with respect to the top of said silo, and a respective second position, the location of said second positions being immediately above and varying with the level of said matter previously deposited into said silo, said containers configured to receive said matter at said first position, to transport said matter from said first position to said second position, and to discharge said matter at said second position;
   (b) means for transporting each of said containers between said first position and said second position;
   (c) means located at the top of said silo for receiving said matter from said delivery means and for depositing said matter into said containers when said containers are located at said first position, said receiving means being fixed in location with respect to said silo and to said delivery means; and
   (d) means for discharging said matter from each of said containers when said container is at said second position, whereby when said matter is discharged from said container, said matter falls a sufficiently short distance such that said matter remains substantially intact.

2. The apparatus as claimed in claim 1, wherein said transporting means includes means for individually supporting and transporting each of said containers between said first position and said second position.

3. The apparatus as claimed in claim 2, wherein said receiving and depositing means further comprises:
   (a) a receiving chute located at the top of the silo disposed to receive matter from said delivery means by gravity flow; and
   (b) means associated with said receiving chute for selectively charging said containers with discrete amounts of said matter by gravity flow when said containers are at said first position.

4. The apparatus as claimed in claim 3, wherein said supporting and transporting means comprises:
   (a) a plurality of cables attached to said containers; and
   (b) means connected to each of said cables for retracting and paying out said cables.

5. The apparatus as claimed in claim 4, wherein each of said containers has a closed bottom and open top, and said discharge means includes at least one cable individually connected to said containers for tipping said container when said container is at said second position, whereby said matter is discharged from said container through said open top by said tipping.

6. The apparatus as claimed in claim 4, wherein said retracting and paying out means comprises at least one winch.

7. The apparatus as claimed in claim 6, further comprising means for sensing the level of matter deposited in said silo.

8. The apparatus as claimed in claim 7, wherein the height of said sensing means may be varied in response to the level of matter previously deposited in said silo.

9. The apparatus as claimed in claim 3, wherein said selective charging means comprises at least one dispensing leg connected to said receiving chute, said leg having an exit and a control gate, said control gate being selectively movable between an open and a closed position with respect to said exit, said dispensing leg being configured to charge said containers when said containers are at said first position.

10. The apparatus as claimed in claim 1 further comprising:
    (a) a first continuous conveyor carrying said containers, said first conveyor including
        (i) a generally horizontal run disposed such that said containers pass through said first position and receive said matter thereat; and
        (ii) a generally vertical run following said horizontal run in the direction of travel of said first conveyor whereby said container and said matter carried by said container are transported downwardly to said second position;
    (b) a charging system disposed immediately adjacent and directly below said second position, and immediately above the level of matter previously deposited into said silo, said charging system including:
        (i) a second continuous conveyor disposed generally horizontally and having a first discharge end and a second discharge end; and
        (ii) means for moving said conveyor in either direction whereby said matter may flow from said container at said second position onto said second conveyor and may flow from said second conveyor from either of said first discharge end or said second discharge end in dependence upon the direction of movement of said second conveyor; and
    (c) means for raising and lowering said charging system in response to the level of matter previously deposited in said silo, whereby when said matter flows from said second conveyor, said matter falls a sufficiently short distance such that said matter remains substantially intact.

11. The apparatus as claimed in claim 10, wherein said charging system further comprises means for varying the horizontal position of at least one of said first and second discharge ends with respect to said silo.

12. The apparatus as claimed in claim 11 further comprising means for sensing the level of said matter in said silo.

13. The apparatus as claimed in claim 12, wherein said sensing means is carried by said charging system.

14. The apparatus as claimed in claim 10, wherein said matter is discharged from said containers by inverting said containers as they pass through said second position.

15. A silo receiving, holding and discharging matter, having delivery means for delivering said matter to the top of said silo, said delivery means being fixed in location with respect to said silo, comprising:
   (a) a receiving chute located at the top of said silo, disposed to receive said matter by gravity flow from said delivery means, said receiving chute including at least one dispensing leg, each dispensing leg having an associated exit and an associated control gate connected to said exit, said control gate being selectively movable between an open and a closed position with respect to said exit;
   (b) at least one container supported individually by a respective support cable, each container being movable between a first position located adjacent one of said dispensing leg at which matter is received by gravity flow from said dispensing leg, and a second position at which matter is discharged by gravity flow from said container, the location of said second position being immediately above and varying with the level of said matter previously deposited into said silo;
   (c) at least one positional winch connected to said support cable, and adapted to effect the movement of said container between said first and said second positions;
   (d) at least one discharge cable attached to said container and adapted to effect the discharge said matter from said container;
   (e) at least one discharge winch connected to said discharge cable and adapted to effect the discharge of material from said container at said second position, whereby when said matter is discharged from said container, said matter falls a sufficiently short distance such that said matter remains substantially intact; and
   (f) a matter level sensor disposed to sense the level of matter within said silo.

16. The apparatus as claimed in claim 15, comprising:
   (a) two dispensing legs;
   (b) two containers;
   (c) two positional winches:
   (d) two discharge cables; and
   (e) two discharge winches.

17. A method for depositing particulate matter in a silo comprising the steps of:
   (a) providing a plurality of containers disposed within said silo;
   (b) delivering said matter to the top of said silo;
   (c) sequentially charging each of said containers at a respective first position with said matter, said first position being fixed in location at and with respect to the top of said silo;
   (d) sequentially moving each of said containers from said first position to a respective second position, the location of said second position being immediately above and varying with the level of said matter previously deposited into said silo;
   (e) sequentially discharging said matter from each of said containers at said second position, whereby said matter falls a sufficiently short distance such that said matter remains substantially intact.

18. The method as claimed in claim 17 further comprising the steps of:
   (a) sequentially moving each of said containers from said second position to said first position.

* * * * *

UNITED STATES PATENT AND TRADEMARK OFFICE
CERTIFICATE OF CORRECTION

PATENT NO. : 4,954,036

DATED : September 4, 1990

INVENTOR(S) : Harold A. Walker

It is certified that error appears in the above-identified patent and that said Letters Patent is hereby corrected as shown below:

Column 2, line 28 "Permanently" should read "permanently"

Column 2, line 58 "Particles" should read "particles"

Column 3, lines 15 and 16 "Particularly Pointing" should read "particularly pointing"

Column 3, line 66 insert "is" after "position which"

Column 4, lines 34 and 35 "container" should read "containers"

Column 4, line 38 "Container" should read --Containers--

Column 4, lines 56 and 57 "60a, respectively and 60b" should read "60a and 60b, respectively"

IN THE CLAIMS:

Claim 1, column 5, lines 28 and 29 "said second positions" should read "said second position"

Claim 15, column 7, line 3 insert "for" before "receiving"

UNITED STATES PATENT AND TRADEMARK OFFICE
CERTIFICATE OF CORRECTION

PATENT NO. : 4,954,036

DATED : September 4, 1990

INVENTOR(S) : Harold A. Walker

It is certified that error appears in the above-identified patent and that said Letters Patent is hereby corrected as shown below:

Claim 16, column 8, line 9 "winches:" should read --winches;--

Signed and Sealed this

Ninth Day of June, 1992

Attest:

DOUGLAS B. COMER

*Attesting Officer*  *Acting Commissioner of Patents and Trademarks*